Feb. 20, 1968   W. H. SCHILLING, JR   3,369,649
CATERPILLAR DEVICE FOR CHAIN TYPE CONVEYOR SYSTEMS
Filed Feb. 16, 1966   3 Sheets-Sheet 3

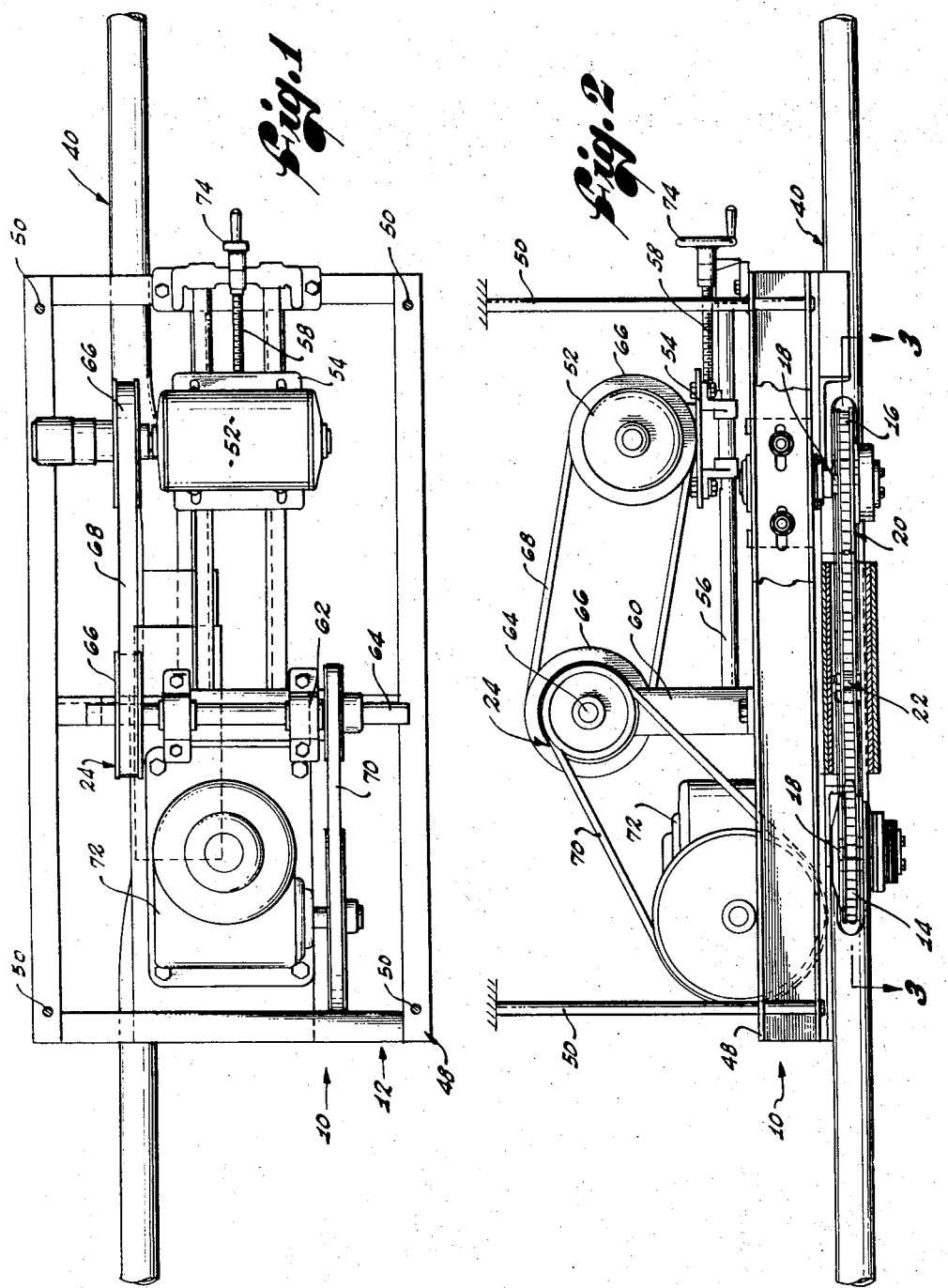

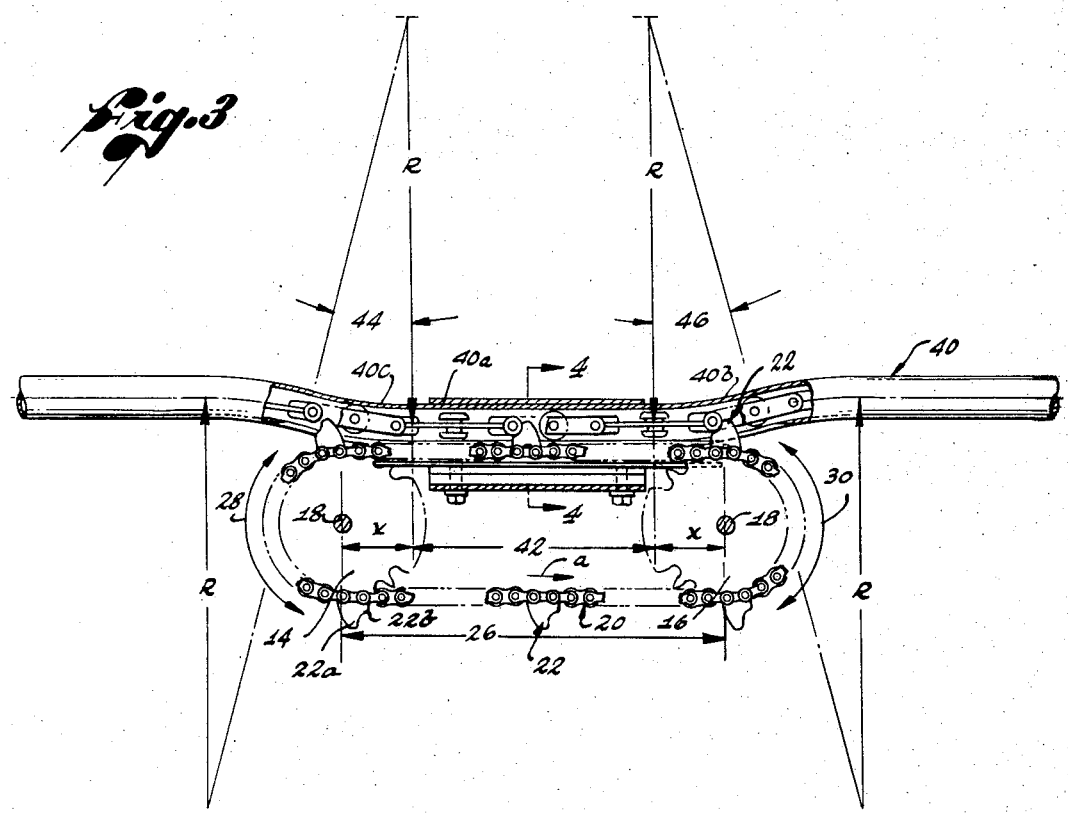
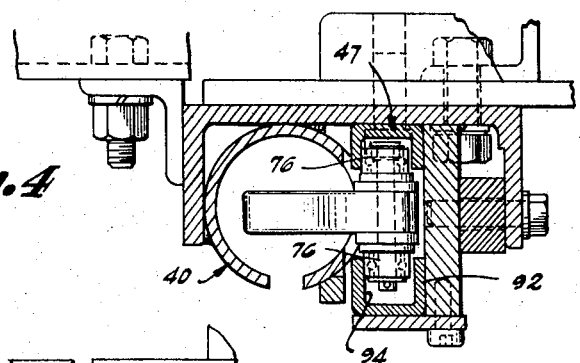
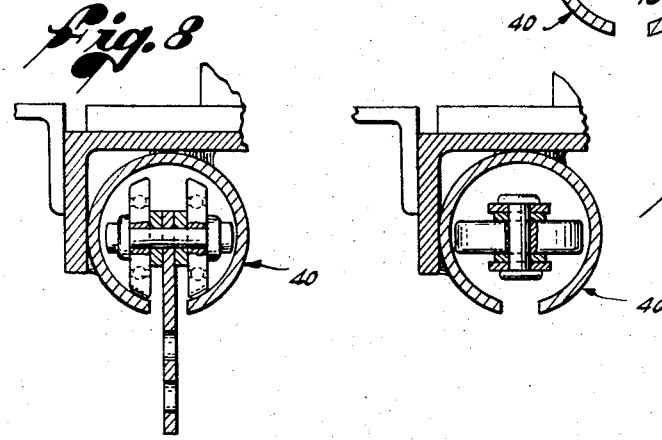

INVENTOR.
WILLIAM H. SCHILLING Jr.
BY Forrest J. Lilly
ATTORNEY

United States Patent Office 3,369,649
Patented Feb. 20, 1968

3,369,649
CATERPILLAR DEVICE FOR CHAIN TYPE
CONVEYOR SYSTEMS
William H. Schilling, Jr., La Habra, Calif., assignor, by mesne assignments, to Hewitt-Robins Incorporated, Stamford, Conn., a corporation of Delaware
Filed Feb. 16, 1966, Ser. No. 527,831
8 Claims. (Cl. 198—203)

This invention relates generally to conveyor systems having a load supporting conveyor chain powered by one or more chain drives each including a driving member meshing with the chain. More particularly, the invention relates to an improved, so-called caterpillar drive for conveyor systems of the class described.

Conveyor systems of the kind to which this invention pertains are widely used in a variety of commercial, industrial, and manufacturing establishments to transport articles from one location to another. To this end, the conveyor chain of such conveyor systems is equipped with load supporting pendants or other means for supporting the articles to be transported. In most cases, the chain is supported and guided in its endwise movement by a conveyor track. The present invention is intended primarily for use in a conveyor system having a tubular guide track which contains the conveyor chain and has a longitudinal slot through which extend load supporting pendants on the chain. For this reason, the invention will be disclosed in connection with such a conveyor system. It should be understood at the outset, however, that the invention is not necessarily limited in usefulness to this particular type of conveyor system.

The conveyor chain in conveyor systems of the kind under discussion is driven in its endwise movement by one or more chain drives, each having a powered driving member which meshes with the chain. In some cases, this driving member is a sprocket having peripheral drive teeth disposed in meshing, driving engagement with the chain. The sprocket is driven in rotation, thus to drive the chain endwise. Chain drives of this kind have one disadvantage. This disadvantage resides in the fact that efficient driving engagement of the drive sprocket with the conveyor chain requires simultaneous driving contact of a number of the sprocket teeth with the chain. Obviously, such multiple tooth contact can be achieved only by training or wrapping the conveyor chain about a substantial portion of the sprocket circumference. As a consequence, such a sprocket drive is normally employed only in those conveyor systems in which the drive sprocket can be located at a turn in the path of movement of the conveyor chain.

In many conveyor systems, however, it is either inconvenient or impossible to thus locate a drive sprocket at a turn in the path of movement of the conveyor chain. In this case, a so-called caterpillar drive is normally employed to drive the conveyor chain. The primary advantage of such a caterpillar drive is that it may be located at any position along a linear or substantially linear run of the conveyor chain. Accordingly, much greater latitude is permitted in the placement of a caterpillar drive than a sprocket drive.

A typical caterpillar drive for such a conveyor chain comprises a powered endless link and roller drive chain of generally conventional construction, certain spaced links of which have outwardly extending, uniformly longitudinally spaced drive dogs pivotally connected therein at the two pivot points of these links. These dogs have outer driving tips or ends formed with drive surfaces which face in the endwise direction of movement of the chain and are adapted for driving engagement with mating thrust surfaces on the conveyor chain. The drive chain is supported on sprockets for movement along an endless path which defines or includes a circularly curved approach run, a generally linear run extending tangentially from the approach run, and a following circularly curved run to which a linear run is tangent. The linear run extends between the sprockets. The following curved run extends about that sprocket toward which the drive surfaces move while on the linear run. The curved approach run extends about the other sprocket, to the linear run. For convenience, the path of the drive chain is hereinafter referred to as a driving path and the linear run of the drive surfaces on the drive chain is referred to as a driving run. The approach and the following curved runs of the driving surfaces are hereinafter referred to in this way or simply as an approach or following run or a curved run.

The conveyor chain is supported by its conveyor track or tube for endwise movement along a predetermined path which is hereinafter referred to as a driven path. This driven path defines a generally linear run of the conveyor chain thrust surfaces which is hereinafter referred to as a driven run.

The drive chain sprockets and conveyor chain track are mounted on a supporting structure in such a way that the driving run of the drive chain and the driven run of the conveyor chain approximately coincide. The drive surfaces on the drive chain and the thrust surfaces on the conveyor chain are disposed for driving engagement during movement of these surfaces along their driving and driven runs, respectively. Accordingly, movement of the drive chain along its closed driving path is effective to drive the conveyor chain along its driven path. As noted earlier, the illustrated conveyor system of the invention has a tubular track containing the conveyor chain. This track or tube is formed with a longitudinal slot through which the outer driving ends of the drive chain dogs extend into driving engagement with the conveyor chain thrust surfaces. These thrust surfaces, in turn, are located approximately on the longitudinal center line of the conveyor chain.

The existing caterpillar drives possess one serious deficiency which this invention seeks to overcome. In this regard, it will be recalled that the primary advantage of a caterpillar drive is its ability to be installed at any position along a linear or nearly linear run of the conveyor chain. This ability of the caterpillar drive stems from the fact that such a drive may be designed to afford simultaneous driving contact with the conveyor chain of any desired number of drive dogs on the drive chain by proper longitudinal dimensioning of the driving and driven runs of the drive chain and conveyor chain, respectively, and proper spacing of the drive and thrust surfaces on these chains.

The deficiency, referred to above, of the existing caterpillar drives is that the drive surfaces on the drive chain remain in driving contact with their respective mating conveyor chain thrust surfaces during movement of the drive surfaces along the entire length of their linear driving run and an initial portion of their following curved run. As a consequence, the conveyor chain is simultaneously drivingly engaged by one or more drive surfaces on the driving run and at least one drive surface on the following curved run. Now it is obvious that the linear velocity of each drive surface equals the linear velocity of the drive chain during movement of the drive surface along its driving run. Accordingly, each drive surface along the driving run has zero velocity relative to the following drive surfaces on the driving run. However, as each drive surface enters the curved run following the driving run, the linear velocity of the drive surface relative to the following drive surfaces on the driving run increases, i.e., the entering drive surface acquires a forward linear velocity component relative to the following drive surfaces on the driving run. This is due, of course, to the fact that the radial distance from the axis of the curved run, i.e., the rotation axis of the drive chain sprocket encircled by the curved run, to each drive surface on the curved run is greater than the radial distance from the axis to the drive chain. Accordingly, the linear velocity of each drive surface on the curved run is greater than the linear velocity of the drive chain and, therefore, greater than the linear velocity of the following drive surfaces along the driving run. In addition, as each drive surface enters the curved run, it recedes from the path of movement of its respective mating conveyor chain thrust surface with the result that the effective contact zone between the mating surfaces moves outwardly along the drive surface. This increases the radial distance between the axis of the curved run and the contact zone of the mating drive and thrust surfaces and hence the effective linear velocity of the drive surface relative to the following drive surfaces on the driving run.

At this point, therefore, it is obvious that as each drive surface on the drive chain travels from its linear driving run to its following curved run, the surface exerts a forward acceleration force on the conveyor chain which continues until the conveyor chain and drive surface are disengaged by movement of the drive surface along the curved run. This acceleration force tends to advance or pull the conveyor chain forwardly relative to the following drive dog or drive dogs along the driving run, thus periodically tensioning a portion of the conveyor chain. The conveyor chain, of course, is subjected to such a forward acceleration force at frequent periodic intervals as the drive dogs travel successively from their driving run to their following curved run.

This intermittent application of a forward accelerating force to the conveyor chain creates undesirable periodic tensions and resulting vibrations or pulsations in the conveyor chain and causes erratic or jerky movement of the chain.

Another deficiency of the existing caterpillar drives resides in the fact that during disengagement of each drive dog from the conveyor chain, the drive surface on the dog and its mating conveyor chain thrust surface slide relative to one another. This relative sliding motion produces a friction force on the conveyor chain in a direction transverse to its direction of movement. In addition, as each drive dog enters the curved run of its drive surface, the angle between the drive surface and the longitudinal center line of the conveyor chain diminishes from substantially a right angle to an acute angle. Because of this angular change, each drive dog produces a lateral camming force on the conveyor chain as the dog and chain disengage. Such lateral frictional and camming forces contribute to intensify the erratic movement of the conveyor chain and shorten its life.

The foregoing discussion relates only to those deficiencies of the existing caterpillar drives which result from continued driving engagement of the drive chain drive dogs with the conveyor chain following entrance of the dog drive surfaces onto the curved run following their linear driving run. The existing caterpillar drives are also deficient in those cases where the drive dogs enter into driving engagement with the conveyor chain prior to arrival of their drive surfaces at the linear driving run. Thus, the path of movement of the drive chain defines a second curved run of the drive surfaces which leads to and merges tangentially with the leading end of the driving run. In the ensuing description, this latter curved run is referred to as an approach run. The drive surfaces on the drive chain travel around this approach run as they approach the driving run and enter into driving engagement with the conveyor chain thrust surfaces. The drive surfaces on the drive dogs, of course, travel around this approach run with a greater linear velocity than the drive chain, for the same reasons discussed earlier in connection with the curved following run. Accordingly, if the drive surfaces enter into driving engagement with their mating conveyor chain thrust surfaces before the drive surfaces reach their linear driving run, the conveyor chain is subjected to periodic forward acceleration forces similar to those which occur during disengagement of the mating drive and thrust surfaces. These forward acceleration forces introduce further erratic movement into the conveyor chain and tend to compress, and thereby buckle, the conveyor chain in the region between each drive dog along the driving run and a following drive dog along the approach run. Moreover, the drive surfaces, while on the approach run, are disposed at an acute angle to the longitudinal center line of the conveyor chain. Accordingly, the drive surfaces produce lateral camming forces on the conveyor chain when these surfaces enter into driving engagement with the conveyor chain while still on the approach run. In addition, the drive surfaces and their mating thrust surfaces on the conveyor chain undergo relative sliding movement as they engage, as they do when they disengage, thereby producing lateral frictional forces on the conveyor chain. As before, these lateral camming and friction forces intensify the erratic movement of the conveyor chain. The conveyor chain advance induced by disengagement of the drive dogs from the conveyor chain while on the curved following run of the drive dog drive surfaces may also cause interference between the conveyor chain and the drive dogs as the latter enter into driving engagement with the conveyor chain while on the curved approach run.

The existing caterpillar drives possess one further deficiency which the present invention seeks to overcome. Thus, it is obvious that the drive dogs along the driving run of their drive surfaces are subjected to reaction forces equal and opposite to the driving forces which these dogs exert on the conveyor chain. These reaction forces tend to rock the drive dogs rearwardly, and perhaps laterally. Such rocking of the drive dogs, if it occurs, interferes with proper driving engagement of the dogs and the conveyor chain. The end result is more pronounced erratic movement of the conveyor chain.

It is now evident, therefore, that a definite need exists for an improved caterpillar drive for conveyor systems of the class described. It is a general object of this invention to provide such an improved caterpillar drive.

A more specific object of the invention is to provide a caterpillar drive wherein the mating drive chain drive surfaces and conveyor chain thrust surfaces disengage prior to entrance of the drive surfaces onto the curved run following their linear driving run, whereby periodic acceleration of the conveyor chain and/or periodic tensioning of the conveyor chain within the driven run of this chain, and the resultant erratic movement of the conveyor chain, are greatly minimized or eliminated.

A related object of the invention is to provide a caterpillar drive wherein the mating drive and thrust surfaces enter into driving engagement after the drive surfaces arrive on their linear driving run, whereby erratic movement of the conveyor chain is further minimized.

Another object of the invention is to provide a caterpillar drive wherein the lateral frictional and camming forces active on the conveyor chain during engagement and disengagement of the mating drive and thrust surfaces are materially reduced by engagement and disengagement of these surfaces while the drive surfaces are on their linear driving run, and wherein further the mating drive and thrust surfaces undergo relative rolling movement during engagement and disengagement thereof, thus to further reduce, if not virtually eliminate, lateral frictional and camming forces on the conveyor chain during engagement and disengagement of the mating surfaces.

A further object of the invention is to provide a caterpillar drive which is uniquely designed for use in a conveyor system of the class having a tubular conveyor track containing the conveyor chain.

Yet a further object of the invention is to provide a caterpillar drive wherein the drive dogs on the drive chain are stabilized against fore-and-aft rocking movement under the reaction forces exerted on these dogs while the latter are disposed in driving engagement with the conveyor chain.

A still further object of the invention is to provide a novel conveyor chain for use with the present improved caterpillar drive.

A further object of the invention is to provide a caterpillar drive which is relatively simple in construction, reliable in operation, produces extremely smooth and uniform movement of the conveyor chain, prolongs the life of the conveyor chain, and is otherwise ideally suited to its intended purposes.

Other objects, advantages, and features of the invention will become readily evident as the description proceeds.

With these and such other objects in view, the invention consists in the construction, arrangement, and combination of the various parts of the invention, whereby the objects contemplated are attained, as hereinafter set forth, pointed out in the appended claims, and illustrated in the accompanying drawings.

In these drawings:

FIG. 1 is a top plan view of an improved caterpillar drive according to the invention;

FIG. 2 is a side elevation of the caterpillar drive in FIG. 1;

FIG. 3 is a section taken on line 3—3 in FIG. 2;

FIG. 4 is an enlarged section taken on line 4—4 in FIG. 3;

FIG. 8 is a section taken on line 8—8 of FIG. 7; and

FIG. 9 is a section taken on line 9—9 of FIG. 7.

Figure 5:
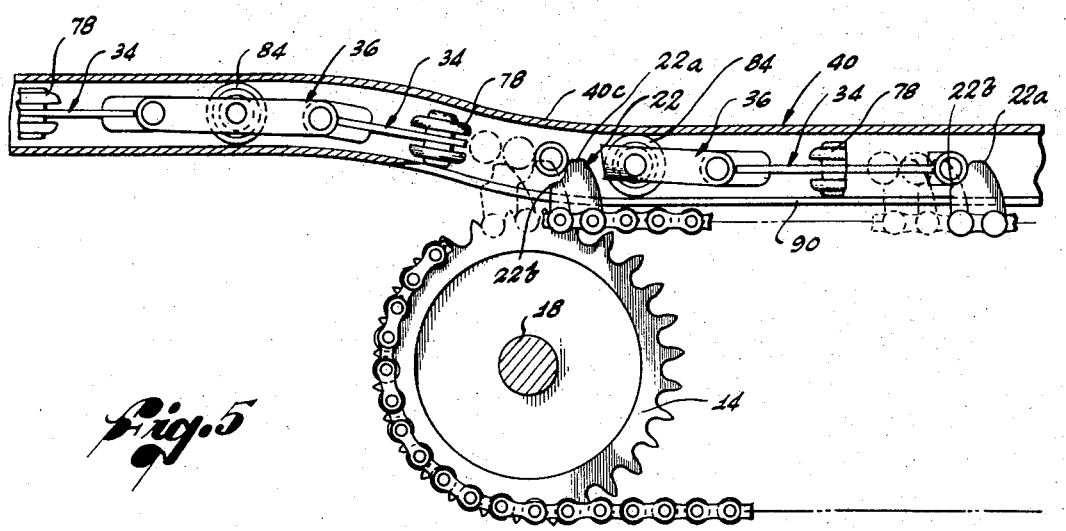
FIG. 5 is an enlarged fragmentary view illustrating the manner in which the mating drive and thrust surfaces of the present caterpillar drive disengage.

Generally speaking, the improved caterpillar drive 10 of the invention which has been selected for illustration in these drawings comprises a supporting structure 12 on which are mounted a pair of rotary sprockets 14 and 16. These sprockets turn on spaced parallel axes 18. Trained about the sprockets 14 and 16 is an endless drive chain 20 including a number of outwardly extending drive dogs 22 which are uniformly spaced along the chain. Drivably coupled to the sprocket 14 are drive means 24 for driving the chain 20 in one endwise direction thereof. In FIG. 3, the direction of movement of the drive chain 20 is indicated by the arrow a. Each drive dog 22 on the drive chain 20 has an outer driving end 22a and a drive surface 22b on this end. The driving ends 22a of the several drive dogs 22 are disposed in a common plane normal to the rotation axes 18 of the drive chain sprockets 14, 16. The drive surfaces 22b on these drive dogs face in the endwise direction of movement of the drive chain.

Drive chain 20 is movable along a closed path of movement. As noted earlier, this path of movement of the drive chain is referred to herein as a driven path. This driven path defines a rectilinear run 26 of the drive chain drive surfaces 22b and a following circularly curved run 28 of these surfaces. The rectilinear run 26 of the drive surfaces 22b, herein referred to as a driving run, extends between the drive chain sprockets 14, 16. The following curved run 28 of the drive surfaces extends coaxially about the sprocket 14 toward which the drive surfaces 22b move when on the driving run 26 and merges tangentially with the adjacent downstream end of the driving run 26. The closed path of movement of the drive chain 20 defines a second circularly curved run 30 of the drive chain surfaces 22b. This second circularly curved run, herein referred to as an appoach run, extends coaxially about the other sprockets 16 and merges tangentially with the adjacent upstream end of the driving run 26.

The conveyor chain which is driven by the caterpillar drive 10 is designated in the drawings by the reference numeral 32. This conveyor chain is composed of a number of alternating, pivotally connected links 34 and 36. Uniformly spaced along the conveyor chain 32 are a number of thrust surfaces 38. As may be readily observed in the drawings, the conveyor chain thrust surfaces 38 face in one endwise direction of the conveyor chain and are located approximately on the longitudinal center line of the chain.

Associated with the conveyor chain 32 is a conveyor track 40. This conveyor track supports and guides the conveyor chain 32 for endwise movement along a predetermined path, herein referred to as a driven path. This driven path of the conveyor chain defines a rectilinear driven run 42, a following curved run 44, and a curved approach run 46 of the conveyor chain thrust surfaces 38. As will be explained presently, the curved runs 44 and 46 have a generally circular curvature. The following curved run 44 merges tangentially with the downstream end of the driven run 42. The approach run 46 merges tangentially with the upstream end of the driven run 42.

The drive chain sprockets 14, 16 and the conveyor chain track 40 are relatively positioned so that the driven run 42 of the conveyor chain 32 coincides approximately with the driving run 26 of the drive chain 20. Also, the drive surfaces 22b on the drive chain and the thrust surfaces 38 on the conveyor chain are disposed for driving engagement while on their respective linear driving and driven runs 26, 42, respectively. It is now evident, therefore, that movement of the drive chain 20 along its closed driving path is effective to drive the conveyor chain 32 endwise along its driven path. The drive dogs 22 are restrained against rocking movement endwise of the drive chain while these dogs are disposed in driving engagement with the conveyor chain by means of interengaging guide means 47 on the drive chain and supporting structure, respectively.

The curved approach and following runs 46, 44 of the conveyor chain thrust surfaces 38 are disposed in the common plane of the drive chain drive dogs 22 and curve, in this plane, away from the closed driving path of the drive chain 20 in such a way that the conveyor chain thrust surfaces approach and emerge from driving engagement with the drive chain along curved direction lines. The curvature of the runs 44, 46 and the length of the intervening driven run 42 of the thrust surfaces are such that each thrust surface enters into and emerges from driving engagement with its respective mating drive surface 22b on the drive chain during movement of the mating drive surface along its linear driving run 26. Moreover, the mating drive and thrust surfaces undergo relative rolling motion during engagement and disengagement thereof. Accordingly, the undesirable actions, referred to earlier, which occur in the existing caterpillar drives are eliminated.

Referring now in greater detail to the illustrated caterpillar drive 10, the supporting structure 12 will be seen to comprise a normally horizontal frame platform 48 with hangers 50 for suspending the platform from the ceiling of a room. In some applications, it may be desirable to support the platform 48 on the floor, in which event the platform will be provided with suitable floor-engaging supports. Drive chain sprockets 14, 16 are rotatably mounted on the normally underside of this platform with their rotation axes 18 vertical. It is now obvious, therefore, that the common plane of the outer driving ends 22a of the drive dogs 22 on the drive chain 20 is approximately a horizontal plane. The reason for this horizontal disposition of the drive dog plane will appear presently.

The drive means 24 for the drive chain 20 comprises a main drive motor 52. Motor 52 is fixed to a carriage 54 which slides on horizontal rails 56 on the platform 48. A lead screw 58 is coupled between the platform and the motor carriage 54 for driving the motor 52 back and forth lengthwise of the rails 56. Centrally mounted on the platform 48, at one end of the rails 56, is an upright support 60 mounting bearings 62 which rotatably support a shaft 64. The motor shaft and the shaft 64 are parallel and mount pulleys 66 and 67. One of these pulleys is a spring-loaded, variable diameter pulley. Trained about the pulleys 66 and 67 is a drive belt 68. Shaft 64 drives the drive chain sprocket 14 through a belt 70 and a speed reducer 72. It is evident at this point, therefore, that the sprocket 14 and hence the drive chain 20 are driven by the motor 52. The speed of the drive chain may be regulated by turning the handle 74 on the end of the lead screw 58 to drive the motor 52 in one direction or the other along its supporting rails 56, thereby to vary the spacing between the pulleys 66 and 67 and hence their ratio.

Figure 6:
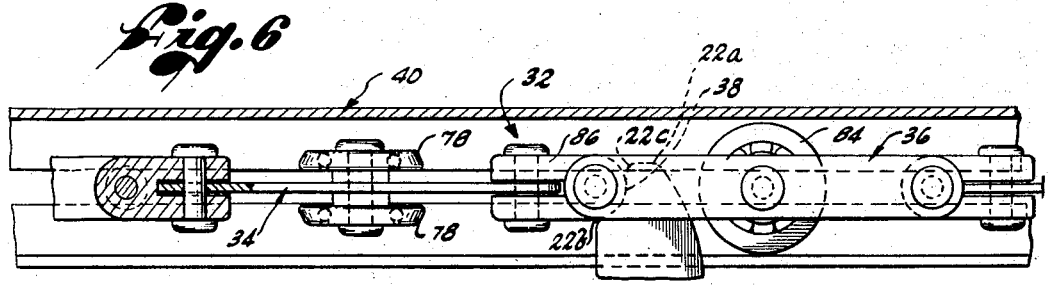
FIG. 6 is an enlarged horizontal section taken through the conveyor chain track within the linear driven run of the conveyor chain.
Figure 7:
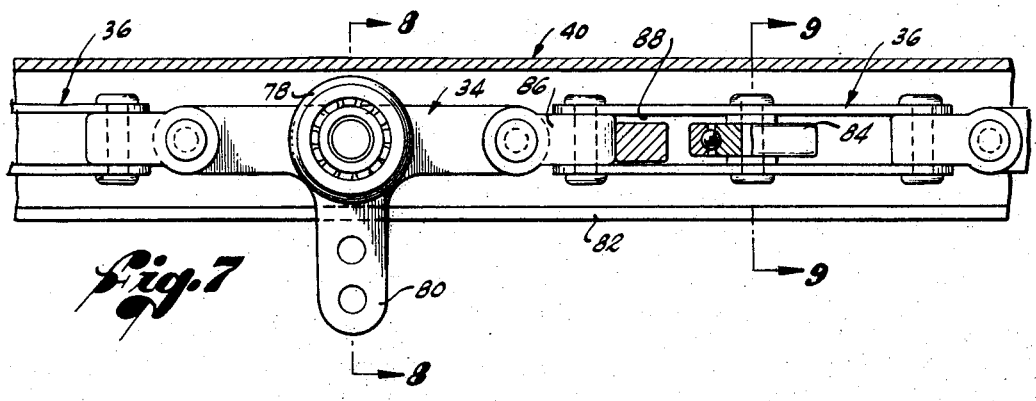
FIG. 7 is a section taken on line 7—7 of FIG. 6.

Referring to FIG. 6, the front edge of the outer driving end 22a of each drive dog 22 is recessed or cut away to form the drive surface 22b. The inner end of each drive surface is rounded and turns forwardly to intersect the front edge of the respective drive dog. The outer end of each drive surface is convexly rounded and turns rearwardly to define a rounded tip 22c on the respective drive dog. Each link of the drive chain 20 which mounts a drive dog 22 has laterally projecting guide members or rollers 76 adjacent its ends which form part of the guiding means 47.

The conveyor track 40 in the illustrated caterpillar drive comprises a tube which contains the conveyor chain 32. This tubular conveyor track is rigidly attached in some way to the supporting platform 48 of the drive, adjacent the run of the drive chain 20 which defines the driving run 26 of the drive surfaces on the chain. It will be recalled that the conveyor chain 32 is composed of alternating, pivotally connected links 34 and 36. Links 34 are vertical links including vertical rollers 78 which roll on the inside of the conveyor track 40. These links have generally T-shape defining load supporting pendants 80 which hang downwardly through a longitudinal slot 82 in the underside of the track. The intervening conveyor chain links 36 are horizontal links including horizontal rollers 84 which ride on the inside of the conveyor track 40. Links 34, 36 are pivotally connected by intervening universal coupling links 86. These coupling links are pivotally attached on horizontal axes to the adjacent vertical links 34 and on vertical axes to the adjacent horizontal links 36. The coupling links 86, therefore, provide universal pivotal connections between the adjacent conveyor chain links 34, 36. The conveyor chain thrust surfaces 38 comprise the rear end or trailing surfaces of the coupling links 86. These thrust surfaces and the rollers 84 of the adjacent horizontal links 36 define therebetween horizontal spaces or recesses 88 which receive the outer driving ends 22a of the drive chain dogs 22, in the manner described below. It is significant to note at this point that the conveyor chain thrust surfaces 38 are generally cylindrically rounded about their respective adjacent vertical pivot axes and are located approximately on the longitudinal center line of the conveyor chain.

The conveyor chain track 40 has a straight section 40a and two curved sections 40b and 40c which are located in the common horizontal plane of the drive dogs 22 and define the driven run 42, the approach run 46, and the following run 44, respectively, of the conveyor chain 32. The two curved track sections 40b and 40c merge tangentially with the ends of the intervening straight track section. Beyond the curved sections 40b and 40c of the conveyor track 40, the latter may follow any desired route. In the drawings, for example, the portions of the conveyor track 40 beyond the curved sections are straight and collinear. Extending longitudinally of the conveyor track 40, throughout the straight and curved sections 40a, 40b, and 40c thereof, is a horizontal slot 90. This slot opens through the convex sides of the curved track sections and the corresponding side of the intervening straight track section and toward the drive chain 20. Track slot 90 is disposed in the common horizontal plane of the drive chain dogs 22. The outer driving ends 22a of the drive dogs extend through the track slot 90 and into the conveyor chain recesses 88 for driving engagement with the conveyor chain thrust surfaces 38 during movement of the drive dogs along the driving run 26. Thus, as noted earlier, the driving run 26 of the drive surfaces 22b and the driven run 42 of the conveyor chain thrust surfaces 38 approximately coincide. Also, the drive and thrust surfaces 22b, 38 are disposed for driving engagement within these driving and driven runs. Accordingly, the conveyor chain 32 is driven endwise along its driven path by endwise movement of the driving chain 20 along its closed driving path. It is significant to note here that the drive dogs 22 on the drive chain 20 enter the conveyor track 40 from the side, while the conveyor chain load supporting pendants 80 depend below the underside of the track, whereby the drive dogs and pendants do not interfere with one another.

Mounted on the supporting platform 48 adjacent the straight section 40a of the conveyor chain track 40, and at opposite sides of the horizontal track slot 90, are a pair of channels 92. These channels open vertically toward one another to define guideways 94 extending lengthwise of the driving and driven runs 26, 42. Guideways 94 receive the guide members or rollers 76 on the drive chain 20 during movement of the adjacent drive dogs 22 along the driving run 26. The drive chain guide rollers 76 and guideways 94 cooperate with the guide members to restrain or stabilize the drive dogs against rocking movement endwise of the drive chain 20 while the dogs are disposed in driving engagement with the conveyor chain and together constitute the guiding means 47 referred to earlier.

A highly important feature of the invention resides in the fact that the straight section 40a of the conveyor track 40 and, hence, the linear driven run 42 of the conveyor chain thrust surfaces 38 are substantially shorter than the linear driving run 26 of the drive chain drive surfaces 22b. The curvature of the curved track sections 40b, 40c and, hence, the curvature of the curved approach and following runs 46, 44 of the conveyor chain thrust surfaces 38 are such that the thrust surfaces are guided into and from driving engagement with the drive chain drive surfaces 22b while the latter are on their driving run 26. In other words, the curvature of the curved track sections 40b, 40c is such that each thrust surface 38 on the conveyor chain 32 enters into driving engagement with its mating drive surface 22b after the drive surface has moved from the curved approach run 30 onto the linear driving run 26. Similarly, each conveyor chain thrust surface 38 disengages its respective mating drive surface 22b prior to entrance of the drive surface onto the curved run 28 following the linear driving run 26. Thus, the mating chain drive and conveyor chain thrust surfaces 22b, 38 are disposed in driving engagement only within their respective linear runs 26, 42. The undesirable actions, referred to earlier, which occur in the existing caterpillar drives as a consequence of engagement and disengagement of their drive and thrust surfaces while the drive surfaces are on the curved portions of their runs are eliminated in the present improved caterpillar drive. Moreover, as noted earlier, and hereinafter explained in greater detail, the mating drive and thrust surfaces in the present caterpillar drive undergo relative rolling movement during engagement and disengagement thereof. This rolling movement of the mating surfaces minimizes or eliminates the lateral frictional and camming forces, also referred to earlier, which are exerted by the drive dogs on the conveyor chain in the conventional caterpillar drives. As a consequence of the foregoing advantages, the movement of the conveyor chain in the present caterpillar drive is smooth and uniform, the conveyor chain is not periodically stressed in tension or compression by the drive, and the working life of the conveyor chain is maximized.

The operation of the present improved caterpillar drive 10 is believed to be obvious from the foregoing description. Thus, the conveyor chain 20 is driven endwise along its closed driving path by the motor 52. The drive chain and, hence, the conveyor chain 32 may be adjusted to any desired speed by proper positioning of the motor 52 along its supporting rails 56. The drive surfaces 22b on the drive chain travel periodically and successively along their curved approach run 30, their linear driving run 26, and their curved following run 28. During movement of each drive surface along the driving run 26, the laterally projecting bearing members or rollers 76 on the corresponding link of the drive chain 20 engage in the guideways 94 on the supporting platform 48 to restrain or stabilize the respective drive dog 22 against rocking movement endwise of the drive chain.

Owing to the opposing curvatures of the approach run 30 of the drive chain surfaces 22b and the approach run 46 of the conveyor chain thrust surfaces 38, these runs approach one another in the direction of chain movement in such a way that the outer driving end 22a of each drive dog 22 on the drive chain 20 enters the conveyor chain recess 88 directly behind its respective mating conveyor chain thrust surface 38 as the drive dog rounds the terminal portion of the approach run 30 and approaches the adjacent leading end of the driving run 26. The curvature of the approach run 46 is such that when the drive surface 22b on each drive dog reaches the leading end of the linear driving run 26, the drive surface initially engages its mating thrust surface 38 on the conveyor chain, as shown in FIG. 3. At this point of initial engagement of each drive surface 22b with its mating conveyor chain thrust surface 38, the thrust surface is not yet fully seated in the curved inner end of its mating drive surface. The reason for this is that the curved approach run 46 along which the thrust surface is currently traveling merges tangentially with the linear driving run 26 of the drive surfaces at a position somewhat beyond the leading end of the latter run. Thus, during the interval of initial engagement of each drive surface 22b and its mating conveyor chain thrust surface 38, the drive surface is traveling along its linear driving run 26 while the thrust surface is traveling along the final portion of its curved approach run 46. Accordingly, during this interval of initial engagement of each drive surface and its mating conveyor chain thrust surface, the thrust surface continues to move inwardly toward the inner curved end of its drive surface until the thrust surface finally seats in this curved end of the drive surface upon reaching the position at which the curved approach run of the thrust surfaces becomes tangent to the linear driving run of the drive surface, i.e., at the leading end of the driven run 42 of the thrust surfaces. The drive surface 22b and its mating conveyor chain thrust surface 38 then remain in driving contact during continued movement of these surfaces along the coincident, linear driving and driven runs 26, 42.

Upon reaching the trailing end of the driven run 42, each conveyor chain thrust surface 38 commences arcuate movement along its following curved run 44, while its respective mating drive chain drive surface 22b continues linear movement along the final portion of its driving run 26. Accordingly, during this final interval of movement of the mating thrust and drive surfaces, each thrust surface undergoes disengaging movement away from its mating drive surface. The curvature of the folowing run 44 of the conveyor chain thrust surfaces 38 is such that each thrust surface becomes fully disengaged from its mating drive surface prior to entrance of the drive surface onto its following curved run 28. It is evident at this point, therefore, that the mating drive surfaces 22b on the drive chain 20 and thrust surfaces 38 on the conveyor chain 32 enter into driving engagement after the drive surfaces have emerged from their curved approach run 30. The mating drive and thrust surfaces disengage prior to entrance of the drive surfaces onto the curved run 28 following their linear driving run 26. As noted earlier, therefore, the mating drive chain surfaces 22b and conveyor chain thrust surfaces 38 are disposed in driving contact only within their linear runs 26, 42, wherein the drive surfaces have the same linear velocity as the drive chain 20 and, therefore, zero relative velocity. The undesirable actions which occur in conventional caterpillar drives, i.e., periodic tensioning of the conveyor chain by the successively disengaging drive dogs and the resultant pulsations in the chain, are eliminated in the present improved caterpillar drive.

As noted earlier, the mating drive chain surfaces 22b and the convexly curved conveyor chain thrust surfaces 38 in the present caterpillar drive undergo relative rolling movement during engagement and disengagement thereof. Thus, referring to FIG. 5, it will be observed that during initial disengagement of each drive dog 22 from the conveyor chain 32, the adjacent universal coupling link 86 of the conveyor chain undergoes arcuate movement along the curved section 40c of the conveyor track 40. During this arcuate movement of the coupling link, the later rotates in a clockwise direction, as viewed in FIG. 5, relative to the adjacent, disengaging drive dog. This clockwise rotation of the coupling link produces clockwise rotation of the thrust surface 38 on the link relative to its mating drive surface 22b on the adjacent disengaging drive dog. Accordingly, during initial disengagement of each drive dog 22 from the conveyor chain 32, the adjacent thrust surface 38 on the conveyor chain rolls outwardly along its mating drive surface 22b on the dog. This outward rolling movement of the thrust surface along its mating drive surface continues until the drive surface reaches the end of its linear driving run 26. At this point, the thrust surface reaches the outer end of its mating drive surface, and thus emerges from driving contact with the drive surface, and just engages the curved outer end 22c of the corresponding drive dog. Continued movement of the drive chain 20 now carries the corresponding drive dog 22 onto the curved drive chain run 28. As the drive dog enters this run, it rotates forwardly, thereby causing its rounded outer end 22c to roll on the mating conveyor chain thrust surface 38. Thus, during initial disengagement of each drive dog 22 from the conveyor chain 32, the respective thrust surface 38 on the conveyor chain rolls outwardly along its mating drive surface 22b on the dog. This outward rolling movement of each conveyor chain thrust surface along its mating drive dog surface continues until the surfaces are out of effective driving engagement. During final physical disengagement of each drive dog 22 from the conveyor chain 32, the dog rotates forwardly, as it enters the curved chain run 28, and thereby causes its outer rounded tip 22c to roll on the respective mating conveyor chain thrust surface 38 without imparting driving thrust to the conveyor chain. It is obvious that a similar but reversed rolling action occurs between the mating drive chain surfaces 22b and conveyor chain thrust surfaces 38 during engagement thereof at the leading ends of the driving and driven runs 26, 42. This rolling engagement and disengagement of the mating thrust and driving surfaces is effective to minimize or eliminate the lateral frictional and camming forces on the conveyor chain which exist in the conventional caterpillar drives and create erratic movement of the chain.

It is now evident, therefore, that the invention herein described and illustrated is fully capable of attaining the several objects and advantages preliminarily set forth.

While a presently preferred embodiment of the invention has been disclosed for illustrative purposes, it is obvious that numerous modifications in the design, arrange-

What is claimed as new in support of Letters Patent is:

1. A conveyor including a caterpillar drive comprising, a supporting structure, a pair of coplanar chain sprockets mounted on said supporting structure for rotation about spaced parallel axes, an endless drive chain trained about said sprockets and including outwardly extending drive dogs, means for driving said drive chain in one direction about said chain sprockets, said drive dogs having outer driving end portions disposed in a plane normal to said axes and drive surfaces on said driving end portions facing in the direction of movement of the drive chain about said chain sprockets, said drive chain being movable along a closed driving path including a rectilinear driving run extending between said sprockets and a curved run extending from and beyond the downstream end of the rectilinear driving run about one of said sprockets, a conveyor chain including pivotally connected links having convexly curved thrust surfaces aligned longitudinally of and uniformly spaced along and facing in similar directions, longitudinally of the conveyor chain, a conveyor track supporting said conveyor chain for movement along a predetermined path including a rectilinear driven run located parallel to said rectilinear driving run of the drive chain, said rectilinear driven run terminating short of the rectilinear driving run and being overlapped by the rectilinear driving run at the downstream end of the latter, and a curved run at the downstream end of and extending from and beyond the rectilinear driven run and curving away from the rectilinear driving run, the drive and convexly curved thrust surfaces associated with portions of the drive and conveyor chains moving along the rectilinear driving and drive runs being in driving engagement with one another, whereby said conveyor chain is driven along said driven path by said drive chain, and said rectilinear driven run of the conveyor chain terminating and merging into the downstream curved run of the conveyor chain in advance of the downstream end point of the rectilinear driving run of the driving chain in such a manner as to effect a rolling disengagement of the mating drive and convexly curved thrust surfaces on the chains by virtue of the convex curvature of the thrust surfaces and the rolling motion thereof as the conveyor chain traverses its said curved run, and before the driving chain enters substantially into its downstream curved run.

2. A conveyor as claimed in claim 1, wherein the curved run at the downstream end of the rectilinear driven run curves first away from the rectilinear driving run and then back into parallelism therewith in an S-curve pattern.

3. A conveyor as claimed in claim 1, wherein the thrust surfaces of the conveyor chain are located on the longitudinal center line of the conveyor chain, said conveyor track comprises a tube containing the conveyor chain and having a rectilinear portion guiding the conveyor chain on its rectilinear driven run and a curved portion downstream of the rectilinear portion and guiding the conveyor chain over its curved downstream run, said rectilinear and downstream curved portions of the tube having a longitudinal slot through which the said drive dogs extend into driving engagement with the thrust surfaces.

4. A conveyor as claimed in claim 1, wherein the tube has a longitudinal slot in its underside and said conveyor chain includes load supporting pendants which extend downwardly through the slot to the exterior of the tube.

5. A conveyor as claimed in claim 4, wherein the plane in which the pair of coplanar chain sprockets are located is a horizontal plane.

6. A conveyor as claimed in claim 1, wherein the drive dogs are fixedly connected to links of the drive chain, each of the links of the drive chain to which drive dogs are connected having guide members cooperable with guideways on the supporting structure and parallel to the rectilinear driving and driven runs, said guide members and guideways serving to stabilize the drive dogs against rocking movement while said dogs are in driving engagement with the conveyor chain.

7. A conveyor as claimed in claim 1, wherein the rectilinear driven run is shorter than the rectilinear driving run and is overlapped by the rectilinear driving run at both ends, and wherein the drive chain moves over a curved run at the upstream end of the rectilinear drive run, the upstream curved run leading about the other of said sprockets and merging tangentially with the upstream end of the rectilinear driving run, and wherein the conveyor chain moves over a curved run at the upstream end of the rectilinear driven run, the upstream curved run of the conveyor chain merging tangentially with the upstream end of the rectilinear driven run, said rectilinear driven run of the conveyor chain having its upstream end located downstream of the upstream end of the rectilinear driving run, the upstream curved runs curving towards said rectilinear runs from opposite sides thereof as they approach the upstream ends of their respective rectilinear runs, whereby driving engagement of the mating drive and convexly curved thrust surfaces is effected after said drive surfaces emerge from the upstream curved run of the drive chain, and with said convexly curved thrust surfaces moving into said driving engagement by a rolling action owing to said curvature of said thrust surfaces and the curvature of said curved run of said conveyor chain at the upstream end of its said rectilinear run.

8. A conveyor chain comprising a plurality of alternately arranged first and second links having rollers for supporting the links within a tubular conveyor track, the rollers on the said first links being disposed in a first common longitudinal plane of the chain and the rollers on the said second links being disposed in a second comon longitudinal plane of the chain substantially normal to the said first common longitudinal plane, coupling links between adjacent first and second links, means pivotally connecting each coupling link to its adjacent first link on a first pivot axis normal to said first common longitudinal plane, means pivotally connecting each coupling link to its adjacent second link on a second pivot axis normal to said second common longitudinal plane, each first link having a load supporting pendant disposed in said first common longitudinal plane, said coupling links having thrust surfaces at the ends thereof adjacent the rollers of the second links, each of said thrust surfaces being spaced from the adjacent roller of the second link to form a recess which is open laterally of said chain, each thrust surface being in general conformity with a cylinder coaxial with the second pivot axis of the link on which the thrust surface is formed.

References Cited

UNITED STATES PATENTS

| 1,949,691 | 3/1934 | Neher | 198—177 |
| 2,168,852 | 8/1939 | Webb | 198—203 |
| 2,424,055 | 7/1947 | Rousseau | 198—177 |
| 2,536,575 | 1/1951 | Seldin | 198—174 |
| 2,796,975 | 6/1957 | Da Costa | 198—203 |

FOREIGN PATENTS

| 1,160,967 | 3/1958 | France. |
| 1,233,519 | 5/1960 | France. |
| 828,538 | 2/1960 | Great Britain. |

RICHARD E. AEGERTER, *Primary Examiner.*

EVON C. BLUNK, *Examiner.*